United States Patent [19]
Nakagawa

[11] Patent Number: 6,064,471
[45] Date of Patent: May 16, 2000

[54] DISTANCE MEASURING DEVICE

[75] Inventor: Tetsuya Nakagawa, Tokyo, Japan

[73] Assignee: Mitsubishi Denki Kabushiki Kaisha, Tokyo, Japan

[21] Appl. No.: 09/066,678

[22] Filed: Apr. 28, 1998

[30] Foreign Application Priority Data

Nov. 26, 1997 [JP] Japan ................................. 9-324500

[51] Int. Cl.[7] ............................. G01C 3/08; G02B 26/08
[52] U.S. Cl. ......................... 356/4.01; 359/199; 359/213
[58] Field of Search ....................... 356/4.01, 5.01–5.15; 359/196–200, 213–215

[56] References Cited

U.S. PATENT DOCUMENTS

| | | |
|---|---|---|
| 4,632,543 | 12/1986 | Endo . |
| 4,934,781 | 6/1990 | Kato et al. . |
| 5,699,150 | 12/1997 | Katayama ................................ 356/4.01 |
| 5,764,398 | 6/1998 | Hayakawa ............................... 359/203 |

FOREIGN PATENT DOCUMENTS

| | | |
|---|---|---|
| 3-175390 | 7/1991 | Japan . |
| 3-95979 | 9/1991 | Japan . |
| 6-13786 | 5/1994 | Japan . |

*Primary Examiner*—Stephen C. Buczinski
*Attorney, Agent, or Firm*—Sughrue, Mion, Zinn Macpeak &n Seas, PLLC

[57] ABSTRACT

A distance measuring device comprising a mirror for scanning an emitted laser beam, a swinging shaft around which the mirror is swung, a permanent magnet which swings along with the mirror, a core arranged at a predetermined space from the permanent magnet, a coil wound around the core, and a circuit for applying an alternating current to the coil is provided, whereby a structure for scanning the laser beam and a method of controlling the scanning can be simplified. Further a controlling performance can be improved, and miniaturization is possible.

21 Claims, 7 Drawing Sheets

DISTANCE MEASURING DEVICE

BACKGROUND OF THE INVENTION

1. Field of the Invention

The present invention relates to a distance measuring device which emits a scanning laser beam; receives a light reflected by an object; and detects a distance from the object.

2. Discussion of Background

Conventionally, there has been proposed various devices for measuring a distance from an object by emitting a scanning laser beam over a predetermined angle. For example, FIG. 10 shows a conventional device disclosed in Japanese Unexamined Utility Model Publication No. Hei 3-95979 (JP-A-3-95979), wherein a schematical view of a mechanism for swinging a mirror is shown. In FIG. 10, numeral 4 designates a mirror for reflecting a laser beam provided on a revolving shaft 5. Numeral 40 designates a permanent magnet having a north pole and a south pole, and which is provided in the periphery of a movable coil 42 wound around a core 41. Numerals 43a and 43b designate conductive spiral springs which urge turning effects opposing to each other. First ends of the springs are respectively fixed to the end portions of the core 41 and the other ends of the springs are connected to a driving circuit 44. When an electric current is applied in the direction of an arrow 45 by the driving circuit 44, the mirror 4 is rotated in the right direction, and when an electric current is applied in the reverse direction, the mirror is rotated in the left direction. The device is constructed so that the laser beam can be scanned by the rotation of this mirror.

In this conventional device, the permanent magnet is fixed and the coil portion is rotated by applying electricity in order to swing the mirror. Therefore, a moving part is massive and the lead wires connected to the coil portion may possibly break because of the movement of the lead wire.

Further, there was disclosed a scanning radar device in Japanese Unexamined Patent Publication No. Hei 7-92256 (JP-A-7-92256). The device scans in both directions of emitting light and receiving light. In FIG. 11, a structure of a light receiving portion and the vicinity thereof is shown. A light 46 reflected by a scanning mirror 4 is received by a light receiving element 42 after passing through a condensing lens 11. The mirror 4 rotates around a revolving shaft 5. A mechanism for scanning comprises a rotor 51 substantially in a half cylindrical shape provided in the back side of the mirror 4 and a stator 52 arranged at a constant space from the rotor 51. The rotor 51 has a three layer structure made of a permanent magnet interposed between an upper plate of magnetic pole and a lower plate of magnetic pole. In both peripheries of the plates of magnetic pole, tooth profiles are formed so that the upper tooth profile and the lower tooth profile deviate from each other by a half pitch. Because the plates of magnetic pole are a permanent magnet, one of the plates is magnetized to be the north pole and the other is magnetized to be the south pole. The stator 52 has electromagnetic coils 52a, 52b and 52c having tooth profiles which are arranged oppositely to the tooth profiles 51a.

Next, steps of swinging the mirror 4 will be described. The coil portions 52a through 52c are in an initial position when electricity is not applied. When the coil 52a is applied with electricity and magnetized to be the south pole, the south pole and the north pole of the plates are moved from an initial position to settle in a position where a protrusion of one plate of a magnetic pole becomes the north pole, a recess of the other plate becomes the south pole, and these protrusion and recess are balanced with a recess of the coil 52a being the south pole. Then, when the coil 52a and the coil 52b are applied with electricity, protrusions of north pole in the plate of magnetic pole are attracted to protrusions of south pole in the coils, and south poles in the other plate of magnetic pole are repulsed by the protrusions of south pole in the coils, whereby the plates of magnetic pole and the coils are balanced after the plates of magnetic pole are moved by a predetermined value of θ. Then, when the coil 52a is not applied with electricity and the coils 52b and 52c are applied with electricity, the plates of magnetic pole are moved further by θ in the same manner. On the contrary, when the coil is applied with electricity to be the north pole, it is possible to rotate reversely. Accordingly, it is possible to rotate by a predetermined value of θ by applying electricity sequentially to the coils.

In this conventional device, it was possible to swing the mirror by only a predetermined value θ and the plurality of electromagnetic coils were necessary.

However, the conventional device had problems that the mirror and the mechanism for swinging were complicated; the number of parts composing the devices was large; the method of controlling swing motion was complicated; and successive swinging was impossible.

SUMMARY OF THE INVENTION

It is an object of the present invention to solve the above-mentioned problems inherent in the prior art and to provide a device in which a mirror and a mechanism for swinging have a simple structure; the number of parts is reduced; a method of controlling swing motion of the mirror is simplified; successive swinging can be controlled; and the device is miniaturized.

According to a first aspect of the present invention, there is provided a distance measuring device comprising: a beam emitter for scanning a laser beam by swinging a mirror over a predetermined range; a beam receptor for receiving a light reflected by an object; and a means for determining a distance from the object based on a propagation delay time between a time of emitting the beam and a time of receiving light, wherein said scanning portion comprises a mirror for scanning the laser beam, a swinging shaft around which the mirror is swung, a permanent magnet magnetized in the direction of swing and which swings along with the mirror wherein the permanent magnet is provided in the vicinity of the swing shaft, an electromagnetic coil is arranged in a predetermined position opposing the permanent magnet, and a means is provided for driving the mirror by applying an alternating current to the electromagnetic coil.

According to a second aspect of the present invention, there is provided a distance measuring device which comprises: a beam emitter for emitting a laser beam, a scanning a portion for scanning said laser beam by swinging a mirror over a predetermined range; a light receptor for receiving light reflected by an object; and a means for determining a distance from the object based on a propagation delay time between a time of emitting the beam and a time of receiving light, wherein said scanning portion comprises a mirror for scanning the laser beam, a swinging axis around which the mirror is swung, a permanent magnet magnetized in the direction of swinging and which swings along with the mirror, wherein the permanent magnet is provided in the vicinity of the swinging axis, a core is arranged in a predetermined position opposing the permanent magnet, a coil is wound around the periphery of the core, a means for driving the mirror by applying an alternating current to the coil is provided, a means for detecting a position of the mirror is provided, and a means is provided for a controlling the mirror swing by calculating an amount of swing motion of the mirror based on the detected position and for calculating the coil current so that the amount of swing motion of the mirror becomes a predetermined value.

According to a third aspect of the present invention, there is provided a distance measuring device according to the first aspect or the second aspect of the invention, wherein the core is formed so that a predetermined space from the swinging permanent magnet is always kept in order to obtain an amount of swing motion in proportion to the current applied to the coil and a groove is provided oppositely to an initial position of the permanent magnet.

According to a fourth aspect of the present invention, there is provided a distance measuring device according to any one of the first through the third aspects of the invention, wherein a portion for restricting a range of swinging the mirror is provided in a part of a swingable member or in a part of a non-swingable member.

According to a fifth aspect of the present invention, there is provided a distance measuring device according to any one of the first through the fourth aspects of the invention, wherein a lubricant having a predetermined viscosity is inserted into a bearing for holding the swinging shaft in order to attenuate vibration which occurs during the swing motion of the mirror.

According to a sixth aspect of the present invention, there is provided a distance measuring device according to the fifth aspect of the invention, wherein the mirror is swung by applying an electric current to the coil by the means for driving before the laser beam is emitted so as to lubricate the bearing.

According to a seventh aspect of the present invention, there is provided a distance measuring device according to the fifth or the sixth aspect of the invention, wherein a bobbin used for winding the coil around the core and a holding portion for holding the bearing of the swinging shaft are formed integrally.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 9 as follows, wherein the same numerical references are used for the same or similar portions and description of these portions is omitted.

EXAMPLE 1

Figure 1:
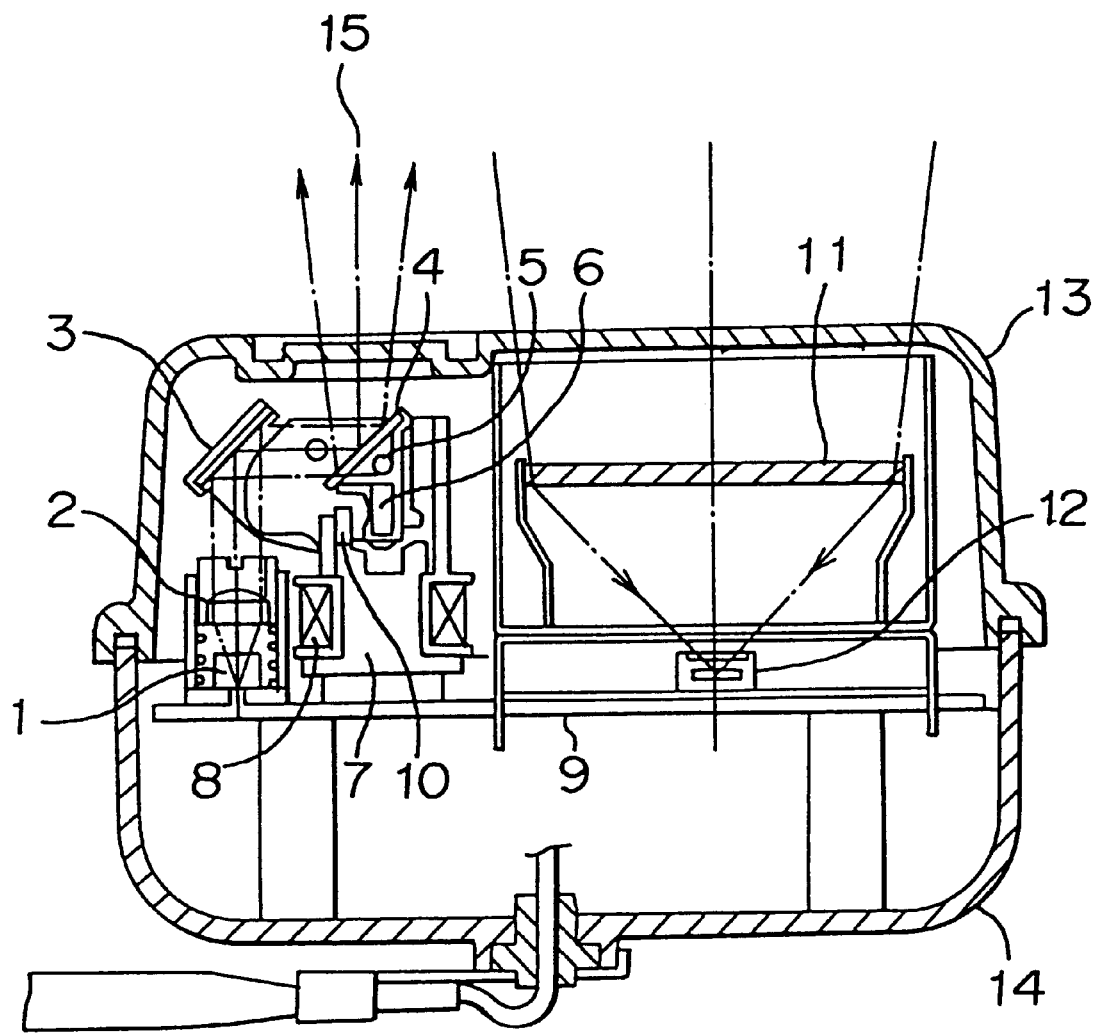
FIG. 1 is a schematical view showing a whole structure of a distance measuring device according to Example 1 of the present invention.

FIG. 1 shows the whole structure of a distance measuring device according to Example 1 of the present invention. In FIG. 1, numeral 1 designates a beam emitting element for emitting a laser beam; and numeral 2 designates a collimator lens for changing the emitted laser beam to a parallel beam. Numeral 3 designates a first fixed mirror which reflects the laser beam by a predetermined angle. Numeral 4 designates a second mirror which irradiates the reflected laser beam toward the outside, wherein the laser beam is sent as exemplified by arrows 15. The laser beam reflected by an object (not shown) existing in a forward space passes through and is converged by a light receiving lens 11 and inputted in an element for receiving light 12. A means for determining a distance from the object based on a propagation delay time between a time of emitting the beam and a time of receiving the light is provided in a substrate 9 and not shown in FIG. 1. Numeral 5 designates a swinging shaft around which the mirror 4 is swung to scan the laser beam. Numeral 6 designates a permanent magnet magnetized in the direction of swing motion and provided in the vicinity of the swinging shaft 5, which permanent magnet is also swingable around the swinging shaft 5. Numeral 7 designates a core, for example that made of iron, provided at a predetermined space from any position of the swingable permanent magnet 6. A coil 8 is wound around the core 7, whereby an electromagnetic coil is constituted by the core and the coil. A means for driving 16 which can apply an electric current to the coil 8 in both directions of positive and negative is provided in the substrate 9 and not shown. The above-mentioned components and means are enclosed in a housing composed of a front cover 13 and a rear cover 14. Meanwhile, if the beam emitting element 1 is arranged in the vicinity of the first mirror 3, the first mirror 3 becomes unnecessary.

Figure 2:
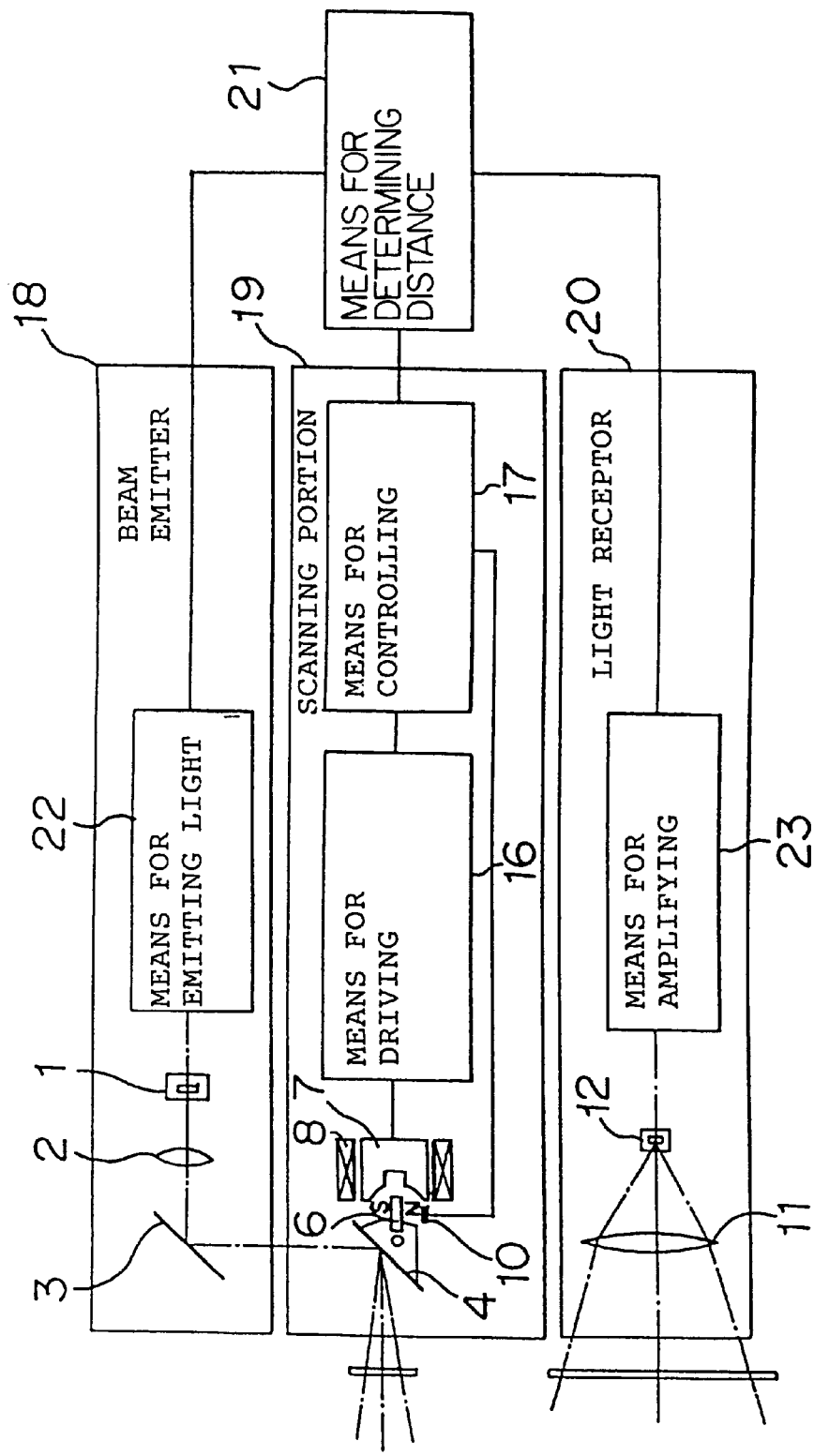
FIG. 2 is a block diagram showing functions of the distance measuring device according to Example 1.

Next, functions of measuring distance according to the present invention is described in detail with reference to FIG. 2. This embodiment is constituted by a beam emitter 18 for emitting a laser beam, a scanning portion 19 for swinging the second mirror 4, a light receptor 20 for receiving the laser beam reflected by an object, and a means for determining distance 21 by calculating a distance from the object and a direction of the object.

The beam emitter 18 comprises a beam emitting element 1, a means for emitting light 22 which drives the beam emitting element, a collimator lens 2, and a first mirror 3, wherein the means for emitting light 22 emits in accordance with a direction from the means for determining distance.

The scanning portion 19 comprises a second mirror 4, a permanent magnet 6, a core 7 around which a coil 8 is wound, a means for driving 16, and a means for controlling 17, wherein a position of the second mirror detected by the position detecting element 10 is transmitted to the means for determining distance 21. Detailed description of a method of scanning will be described below.

The light receptor 20 comprises a light receiving lens 11, an element for receiving light 12, a means for amplifying 23 which amplifies a received micro signal, wherein the signal of receiving light is transmitted to the means for determining distance 21.

The means for determining distance 21, for example, calculates the distance from the object directly from a propagation delay time between a time of a beam being emitted and a time of receiving the light reflected by the object.

$$D=C*(T2-T1)/2$$

where reference C designates a light speed of $3*10^8$ m/s, reference T2 is the time of receiving light, and reference T1 designates the time of the beam being emitted, wherein because the laser beam is emitted and received, the distance from the object shall correspond to a half (½) of the delay time. Also, the scanning angle can be distinguished by data from the position detecting element, whereby the direction of the object in the forward space can be detected. Further, it is possible to obtain a substantial size of the object by this data of direction.

Figure 3A:
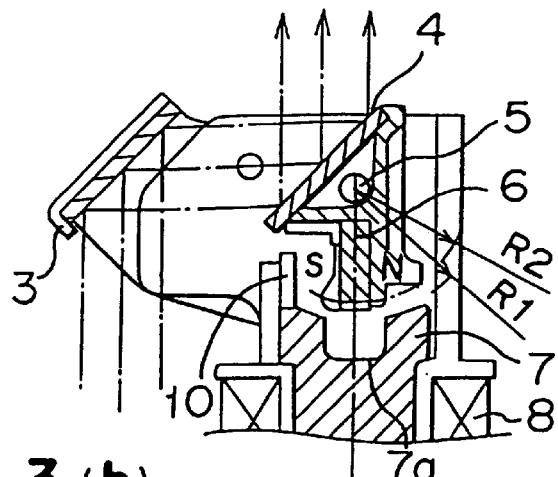
FIG. 3a is an enlarged view of a swingable portion of the distance measuring device according to Example 1 or Example 2.

Next, a method of swinging the second mirror is described with reference to enlarged views of FIGS. 3a through 3c. In FIG. 3a, a case that the coil 8 is not applied with electricity is shown. The permanent magnet 6 and the core 7 are arranged with a predetermined space therebetween. The permanent magnet 6 moves on an arc of a radius of R2 around the swinging shaft 5 and the core 7 is apart from the swinging shaft 5 by a radius of R1. Therefore, a part of the core has a shape of arc. Also in the middle of the core, a recess 7a is formed. Such a structure is in order for opposing the core to the both poles of permanent magnet and assuring maintenance of a center position of the second mirror 4 by balancing the force of attraction of the permanent magnet 6 when the coil is not applied with electricity. Further, it is possible to vary a proportional relationship between the coil current and the swing angle by changing the widths of recess. An efficiency of coil current is increased in a case that the width of recess is larger than the thickness of permanent magnet 6 in comparison with a case that the width of recess is smaller than or the substantially same as the thickness of permanent magnet 6.

Figure 3B:
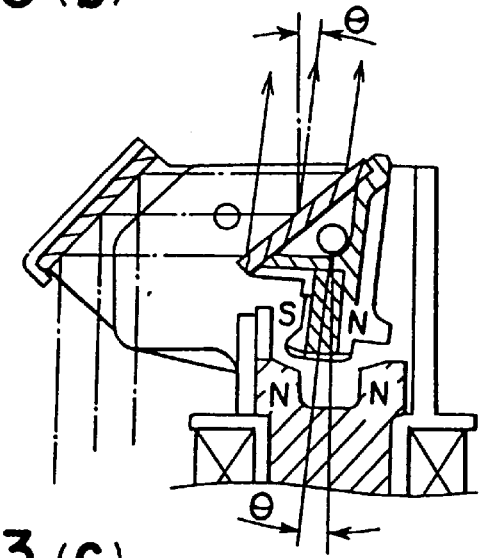
FIG. 3b is an enlarged view of the swingable portion of the distance measuring device according to Example 1 or Example 2.

Next, the coil 8 is applied with an electric current by the means for driving means 16, and the core is magnetized to be the north pole as shown in FIG. 3b. By the attraction between the south pole of permanent magnet 6 and by the north pole of the core and the repulsion between the north pole of permanent magnet and the north pole of core, the permanent magnet 6 is moved around the swinging shaft 5, which movement means that the second mirror 4 is rotated by θ.

The magnetizing force of the core 7 is increased in accordance with the magnitude of current I passing through the coil 8. Since there is the predetermined space between the permanent magnet 6 and the core 7, the coil current I and the swing angle degree have a proportional relationship as shown in FIG. 4. The second mirror 4 is settled in a center position when electricity is not applied and θ=0. Providing the direction of magnetizing the core to be the north pole is a plus (+), the swing angle increases as the current is increased in the plus (+) direction. On the contrary, by applying the current in a minus (−) direction, the second mirror is swung adversely as shown in FIG. 3c. Namely, by controlling the direction of current and the magnitude of current, the mirror can be swung successively. In addition, a portion of swing motion can be composed of the swing motion shaft 5, the mirror 4, the permanent magnet 6 and the members for holding these, whereby miniaturization is obtainable.

Figure 5:
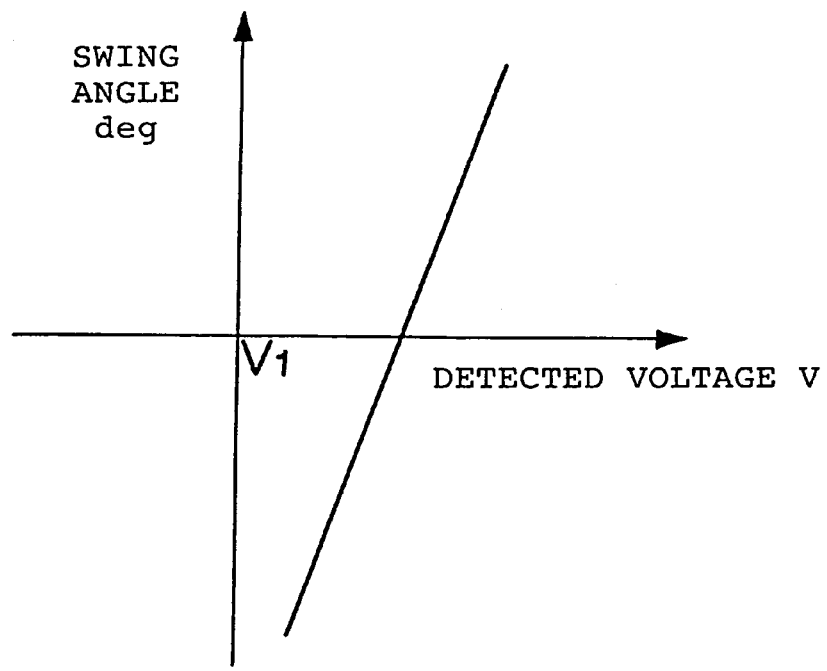
FIG. 5 is a diagram showing a relationship between voltage of a detecting magnetism and the swing angle according to Example 1.

The position detecting device 10 utilizes, for example, a magnetic sensor for detecting magnetic flux density of the permanent magnet 6. The means for controlling calculates the swing angle of the second mirror 4 from this detected magnetic flux density and further the current of coil 8 for rotating the second mirror 4 to be a predetermined swing angle. For example, when a Hall element is used for the position detecting element 10, the detected magnetism corresponding to voltage V and the swing angle degree are in a proportional relationship as shown in FIG. 5. When electricity is not applied to the coil, a predetermined voltage V1 is observed; the voltage V increases as the swing angle becomes closer to +θ; and the detected voltage V decreases as the swing angle becomes closer to −θ because the permanent magnet moves further from the position detecting element. The means for controlling 17 calculates the next current for controlling the coil from this detected voltage V and transmits it to the means for driving 16. Also it is possible to distinguish the swing angle θ which is measured at present by sending this detected voltage to the means for determining distance 21.

In the example described above, the mirror to be swung and peripheral members thereof can have a simple structure and the swing angle can be controlled by the direction and the magnitude of the electric current supplied the coil. Further, the swing angle can be detected easily without any contact and with compactness using a magnetic sensor. Incidentally, although the coil current can be controlled at every detection by detecting the swing angle plural times in every period, a method of controlling the coil current by detecting the swing angle once at a time after swinging a predetermined angle is also applicable.

EXAMPLE 2

Figure 3C:
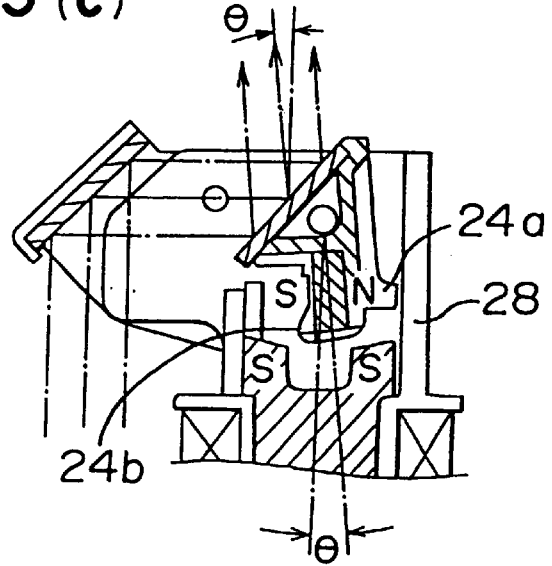
FIG. 3c is an enlarged view of the swingable portion of the distance measuring device according to Example 1 or Example 2.
Figure 4:
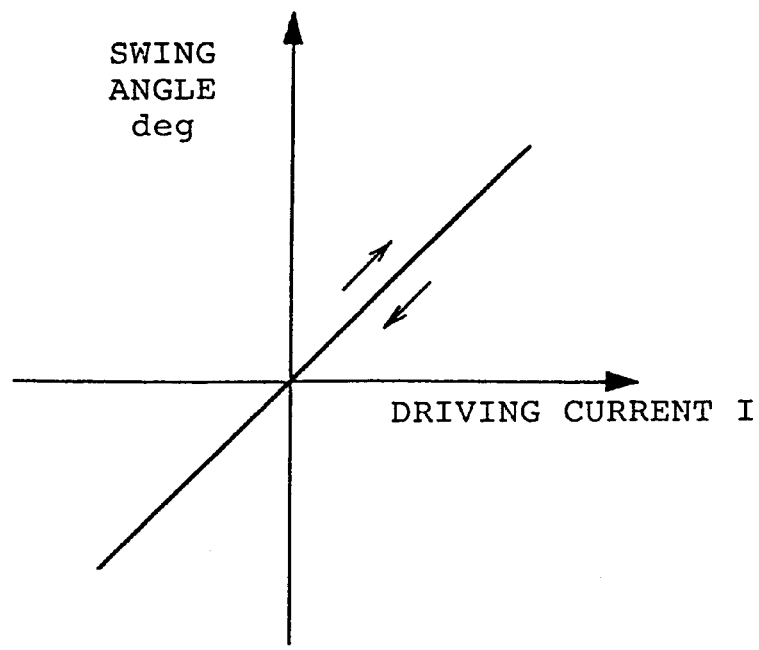
FIG. 4 is a diagram showing a relationship between current of a driving coil and a swing angle according to Example 1.

In FIG. 3c, protrusions 24a and 24b of a member holding the permanent magnet 6 work as the stopper. The stoppers 24a and 24b mechanically restrict movement of the permanent magnet into a range where the control of the permanent magnet is impossible due to an abnormal increment of the coil current, a shock and so on. Although the stopper protrusions are attached to the member holding the permanent magnet, the same effect is obtainable by adding these to an unmovable member 28.

EXAMPLE 3

Figure 6:
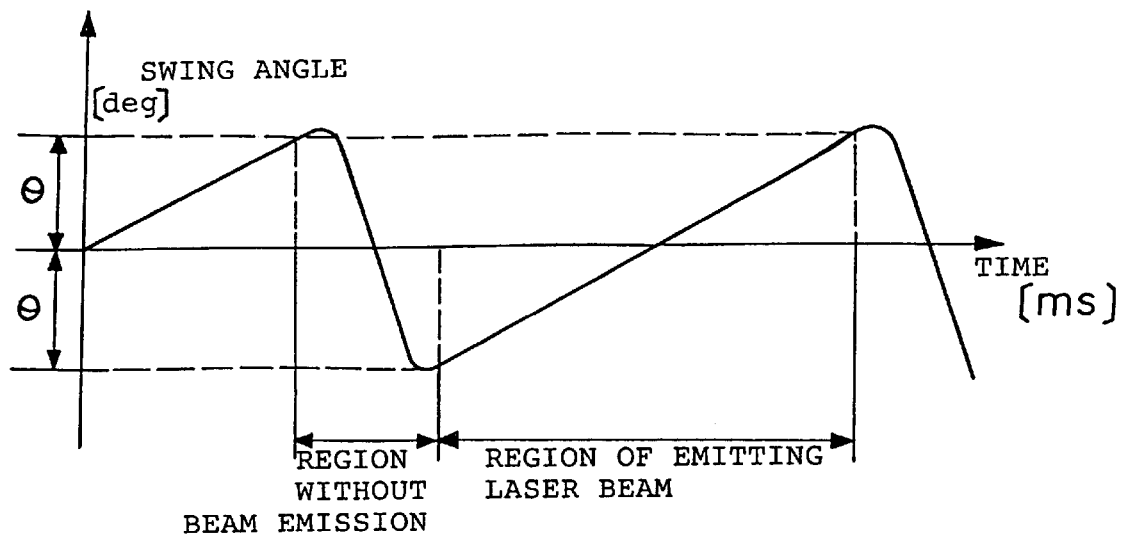
FIG. 6 is a diagram showing a relationship between a swing angle and a period of emitting a laser beam according to Example 3.

FIG. 6 is a diagram showing a relationship between the swing angle of the mirror and the emission of the laser beam, namely distance measurement, in the present invention. Although the laser beam can be emitted successively during swing motion of the second mirror 4, the Figure shows a case that the laser beam is emitted during one way of the swing motion of mirror. The laser beam is emitted only for a swing motion of between −θ and +θ, whereby the distance is measured. Since the emission is not conducted for a returning time from +θ to −θ, it is possible to return the mirror quickly so that linearity is not required.

Figure 7:
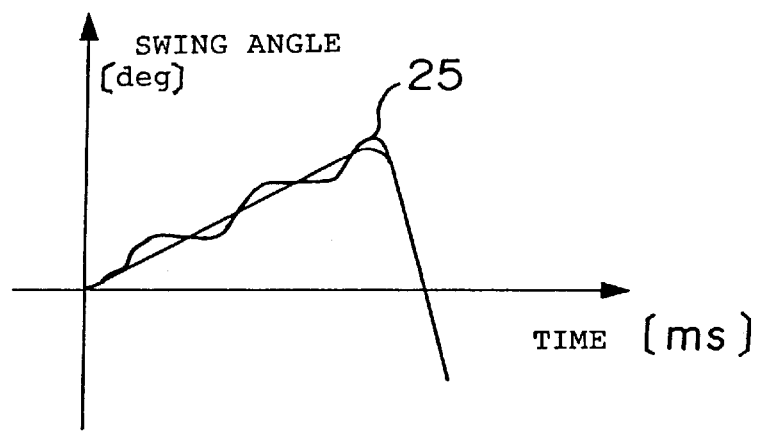
FIG. 7 is a diagram showing vibration at the time the mirror swings according to Example 3.
Figure 8:
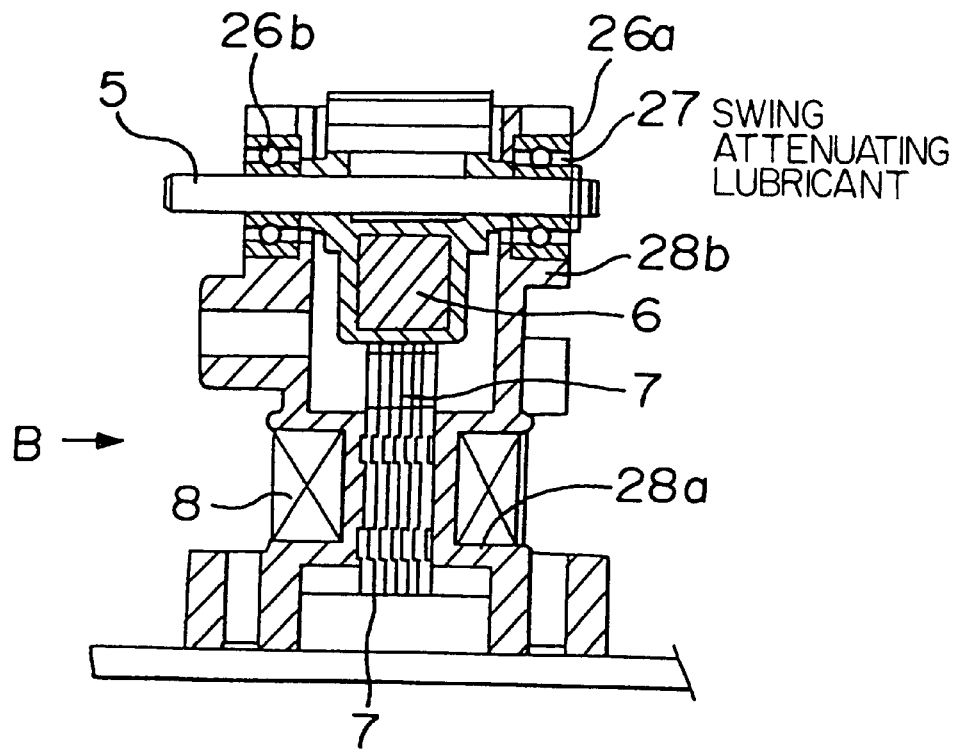
FIG. 8 is an enlarged view of a swingable portion in section according to Example 3 and Example 4.

FIG. 7 is a diagram showing the movement of the second mirror 4, wherein the mirror preferably swings linearly. However, there is a case that the mirror swings with an oscillation as noted with numeral 25. A method of preventing the oscillation is described with reference to FIG. 8. FIG. 8 is a cross-sectional view taken along the middle line of the swinging shaft 5 in FIG. 1, and shows peripheral portions of the swinging shaft 5, the core 7, the coil 8 and so on in FIG. 1. The swinging shaft 5 is supported by a bearing 26, for example a ball bearing. In this example, a pair of bearings 26a and 26b are used. In the ball bearing 26, a lubricant 27 such as silicon oil is inserted. By selecting the oil viscosity and using oil having a high viscosity to a certain extent, it is possible to attenuate oscillation at the time of swinging. Thus it is possible to attenuate the oscillation in the swing motion using such a very simple method.

Further, in a case that the bearing is lubricated by the lubricant 27 before the distance measurement is started, an oscillation in swing motion can be prevented in advance. For this, the means for driving is operated in order to flow an electric current to the coil 8 positively and negatively for several times before the laser beam is emitted. At this time, it is not necessary to consider accuracy and linearity of the electric current, even though an excessive electric current is applied. Also, since the laser beam is not emitted, it is possible to turn over the electric current between the positive direction and the negative direction.

EXAMPLE 4

In FIG. 8, a bobbin 28a is used in order to wind the coil 8 around the core 7. On the other hand, a member 28b for holding the bearing 26 can be integrated with the bobbin 28a by arranging the swinging shaft 5 in the center of core 7. When integrated, the miniaturization of the device is possible and an accuracy of dimensions can be improved.

Figure 9:
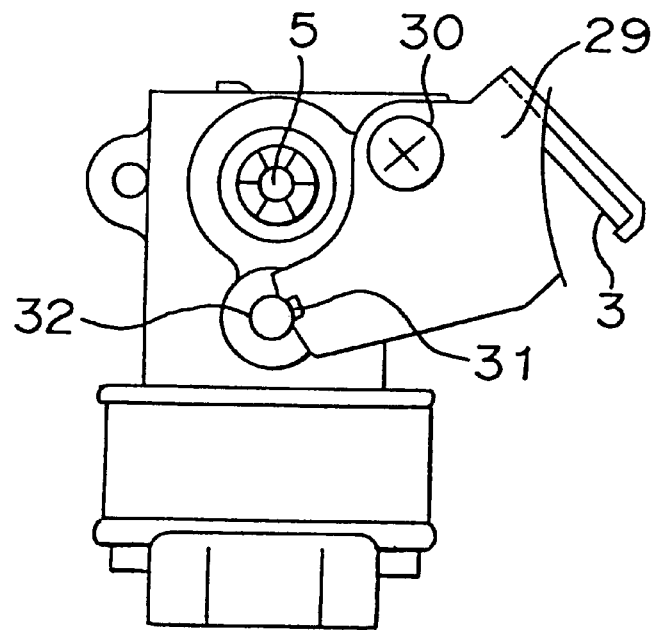
FIG. 9 shows a structure of a first mirror according to Example 4.
Figure 10:
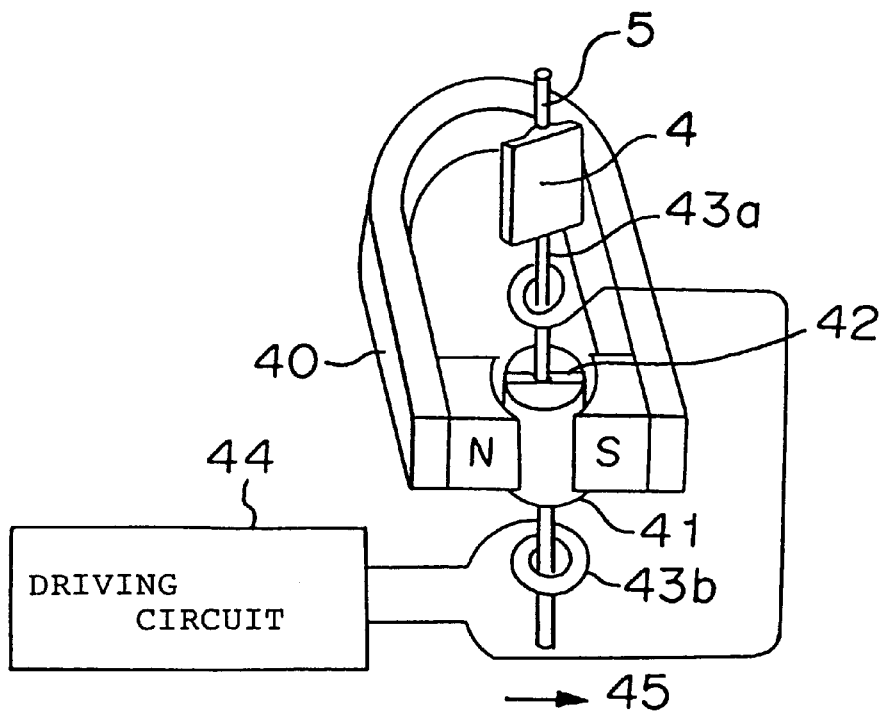
FIG. 10 is a schematical view for showing a structure of conventional distance measuring device.
Figure 11:
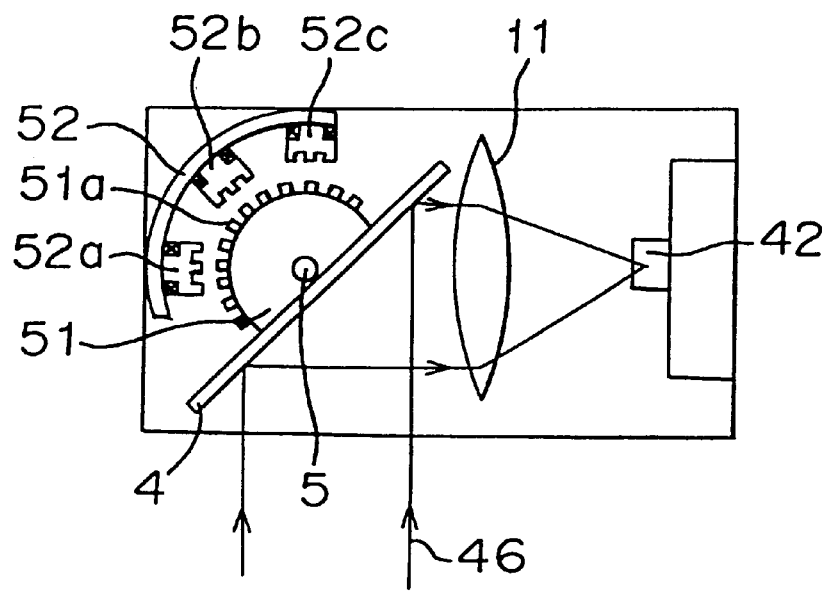
FIG. 11 is a schematical view for showing another structure of conventional distance measuring device.

Next, a method of fine adjustment of the first mirror 3 is described with reference to FIG. 9. FIG. 9 is a side view observed in the direction of an arrow B of FIG. 8. The first mirror 3 determines the direction of the beam axis of laser beam. When the laser beam 15 is not emitted from the front cover in a right angle, because of dimensional inaccuracy of each component, it is necessary to conduct the fine adjustment of the first mirror 3. A member 29 for fixing the first mirror 3 is fixed by, for example, a screw 30. Therefore, the first mirror 3 can rotate around the screw 30. In a portion of the fixing member 29, a recess or a hole 31 is provided so that a tool can be inserted therein. Further, in the integrated bobbin 28, an escape hole 32 is provided. Steps of conducting the fine adjustment of the first mirror 3 are as follows: the screw 30 is loosened; the tool, for example, like a plus driver is inserted into the recess 31 and the escape hole 32; the tool is turned in a direction in which the mirror needs to be rotated, whereby the fixing member 29 turned around the screw 30 at a point that the beam axis becomes a desirable direction. Accordingly, the fine adjustment of the beam axis is possible.

The first advantage of a distance measuring device according to the present invention is that a mechanism for swinging can be simplified and a miniaturization of the device is obtainable because a scanning portion for scanning a laser beam has a mirror for scanning the laser beam, a swinging shaft around which the mirror is swung, a permanent magnet magnetized in the direction of swing motion which is provided in the vicinity of the swinging shaft and swings along with the mirror, an electromagnetic coil arranged in a predetermined position opposing to the permanent magnet, and a means for driving which swings the mirror by applying an alternating current to the electromagnetic coil.

The second advantage of a distance measuring device according to the present invention is that a swinging mechanism can be simplified and a miniaturization of the device is obtainable because a scanning portion for scanning a laser beam has a mirror for scanning the laser beam, a swinging shaft around which the mirror is swung, a permanent magnet magnetized in the direction of swing motion, which is provided in the vicinity of the swinging shaft and swings along with the mirror, a core provided in a predetermined position opposing the permanent magnet, a coil wound around the periphery of the core, a means for driving which swings the mirror by applying an alternating current to the coil, a means for detecting a position of said mirror, and a means for controlling which calculates the amount of swing motion of said mirror based on the detected position and a coil current so that the amount of swing motion becomes a desired amount of swing motion.

The third advantage of a distance measuring device according to the present invention is that control of the swing motion is simplified; a successive control of swing motion is obtainable; and a performance of control can be improved because the core is formed such that a constant space is maintained from a swingable permanent magnet in order to obtain an amount of swing motion in proportion to an electric current applied to a coil and a groove is formed at a portion opposing to an initial position of the permanent magnet.

The fourth advantage of a distance measuring device according to the present invention is that an abnormal movement of the mirror by which swing control becomes impossible can be avoided because a portion for restricting a range of swing motion of the mirror is provided as a part of the swingable member or as a part of a non-swingable member.

The fifth advantage of a distance measuring device according to the present invention is that oscillation of the mirror can be attenuated by a simple structure and a miniaturization of the device is obtainable because a bearing into which a lubricant having a predetermined viscosity is inserted attenuates the oscillation of swingable mirror.

The sixth advantage of a distance measuring device according to the present invention is that oscillation of a mirror can be attenuated early because a scanning mirror can be swung in advance in order to lubricate the bearing.

The seventh advantage of a distance measuring device according to the present invention is that a miniaturization of the device is obtainable and an accuracy of dimensions of the device can be improved because a member for holding a bearing which holds a swinging shaft and a bobbin are formed integrally.

Obviously, numerous modifications and variations of the present invention are possible in light of the above teachings. It is therefore to be understood that within the scope of the appended claims, the invention may be practiced otherwise than as specifically described herein.

What is claimed is:

1. A distance measuring device comprising:

a beam emitter for emitting a laser beam;

a scanning portion for scanning the laser beam by swinging a mirror over a predetermined angular range;

a light receptor for receiving the beam reflected by an object; and a means for determining a distance from the object based on a propagation delay time between a time of emitting a beam and a time of receiving light, wherein the scanning portion comprises a mirror for scanning the laser beam, a swinging shaft around which the mirror is swung, and a permanent magnet magnetized in the direction of swing motion, further wherein said permanent magnet is provided in the vicinity of the swinging shaft and swings along with the mirror, an electromagnetic coil is provided in a predetermined position opposing the permanent magnet, and a means for driving the mirror is provided by applying an alternating current to the electromagnetic coil.

2. A distance measuring device according to claim 1, wherein the electromagnetic coil is formed such that a constant space is maintained from the swinging permanent magnet in order to obtain an amount of swing motion proportional to a current applied to the electromagnetic coil, and a groove is formed in a portion of the electromagnetic coil opposing an initial position of the permanent magnet.

3. A distance measuring device according to claim 2, wherein portions are provided in a part of a swingable member or a part of a non-swingable member so as to restrict a range of swing motion of the mirror.

4. A distance measuring device according to claim 3, wherein a lubricant having a predetermined viscosity is inserted into bearings holding the swinging shaft in order to attenuate an oscillation generated during the swing motion of the mirror.

5. A distance measuring device according to claim 2, wherein a lubricant having a predetermined viscosity is inserted into bearings holding the swinging shaft in order to attenuate an oscillation generated during the swing motion of the mirror.

6. A distance measuring device according to claim 1, wherein portions are provided in a part of a swingable member or a part of a non-swingable member so as to restrict a range of swing motion of the mirror.

7. A distance measuring device according to claim 6, wherein a lubricant having a predetermined viscosity is inserted into bearings holding the swinging shaft in order to attenuate an oscillation generated during the swing motion of the mirror.

8. A distance measuring device according to claim 1, wherein a lubricant having a predetermined viscosity is inserted into bearings holding the swinging shaft in order to attenuate an oscillation generated during the swing motion of the mirror.

9. A distance measuring device according to claim 8, wherein the electromagnetic coil is applied with an electric current from the means for driving so as to swing the mirror and thereby lubricate the bearings before the laser beam is emitted.

10. A distance measuring device according to claim 8, wherein a bobbin for winding a coil around a core of the electromagnetic coil, and a holding portion for holding the bearings of the swinging shaft are formed integrally.

11. A distance measuring device comprising:

a beam emitter for emitting a laser beam;

a scanning portion for scanning the laser beam by swinging a mirror over a predetermined range;

a light receptor for receiving the beam reflected by an object; and a means for determining a distance from the object based on a propagation delay time between a time of emitting a beam and a time of receiving light, wherein the scanning portion comprises a mirror for scanning the laser beam, a swinging shaft around which the mirror is swung, and a permanent magnet magnetized in the direction of swing motion, further wherein said permanent magnet is provided in the vicinity of the swinging shaft and swings along with the mirror, a core is provided in a predetermined position opposing the permanent magnet, a coil is wound around the periphery the core, a means for driving the mirror is provided by applying an alternating current to the coil, a means for detecting position detects a position of the mirror, and a means is provided for controlling mirror swing, further wherein said means for controlling calculates an amount of swing motion of the mirror from the detected position and a coil current.

12. A distance measuring device according to claim 11, wherein the core is formed such that a constant space is maintained from the swinging permanent magnet in order to obtain an amount of swing motion proportional to a current applied to the coil, and a groove is formed in a portion opposing an initial position of the permanent magnet.

13. A distance measuring device according to claim 12, wherein portions are provided in a part of a swingable member or a part of a non-swingable member so as to restrict a range of swing motion of the mirror.

14. A distance measuring device according to claim 13, wherein a lubricant having a predetermined viscosity is inserted into bearings holding the swinging shaft in order to attenuate an oscillation generated during the swing motion of the mirror.

15. A distance measuring device according to claim 12, wherein a lubricant having a predetermined viscosity is inserted into bearings holding the swinging shaft in order to attenuate an oscillation generated during the swing motion of the mirror.

16. A distance measuring device according to claim 11, wherein portions are provided in a part of a swingable member or a part of a non-swingable member so as to restrict a range of swing motion of the mirror.

17. A distance measuring device according to claim 16, wherein a lubricant having a predetermined viscosity is inserted into bearings holding the swinging shaft in order to attenuate an oscillation generated during the swing motion of the mirror.

18. A distance measuring device according to claim 11, wherein a lubricant having a predetermined viscosity is inserted into bearings holding the swinging shaft in order to attenuate an oscillation generated during the swing motion of the mirror.

19. A distance measuring device according to claim 18, wherein the coil is applied with an electric current from the means for driving so as to swing the mirror and thereby lubricate the bearings before the laser beam is emitted.

20. A distance measuring device according to claim 18, wherein a bobbin for winding the coil around the core and a holding portion for holding the bearings of the swinging shaft are formed integrally.

21. A distance measuring device comprising:

a beam emitter which emits a laser beam;

a scanning portion which scans the laser beam by swinging a mirror over a predetermined angular range;

a light receptor which receives the beam reflected by an object; and a circuit which determines a distance from the object based on a propagation delay time between a time of emitting a beam and a time of receiving light, wherein the scanning portion comprises a mirror which scans the laser beam, a swinging shaft around which the mirror is swung, and a permanent magnet magnetized in the direction of swing motion, further wherein said permanent magnet is provided in the vicinity of the swinging shaft and swings along with the mirror, an electromagnetic coil is provided in a predetermined position opposing the permanent magnet, and a circuit applies an alternating current to the electromagnetic coil to thereby drive the mirror.

* * * * *